A. WIDMER.
DRIVING MECHANISM FOR LOOMS.
APPLICATION FILED JUNE 15, 1918.

1,297,623.

Patented Mar. 18, 1919.
2 SHEETS—SHEET 1.

WITNESS:
Wm Bell

INVENTOR,
Adolph Widmer
BY John Steward,
ATTORNEY.

A. WIDMER.
DRIVING MECHANISM FOR LOOMS.
APPLICATION FILED JUNE 15, 1918.

1,297,623.

Patented Mar. 18, 1919.
2 SHEETS—SHEET 2.

WITNESS:
Wm. Bell

INVENTOR,
Adolph Widmer.
By
ATTORNEY.

UNITED STATES PATENT OFFICE.

ADOLPH WIDMER, OF PATERSON, NEW JERSEY.

DRIVING MECHANISM FOR LOOMS.

1,297,623.      Specification of Letters Patent.      Patented Mar. 18, 1919.

Application filed June 15, 1918. Serial No. 240,209.

*To all whom it may concern:*

Be it known that I, ADOLPH WIDMER, a citizen of the United States, residing at Paterson, in the county of Passaic and State of New Jersey, have invented certain new and useful Improvements in Driving Mechanisms for Looms, of which the following is a specification.

In the case of certain machines, for example looms, it is desirable that when the power is applied or cut off the starting-up or stopping should be effected in a quick and positive manner. My present invention is an improvement in drive-controlling mechanisms whereby the operator can with the greatest ease and assurance effect a quick and positive starting-up and stopping of the machine, and it consists in certain combinations and arrangements of parts substantially as hereinafter described and shown in the accompanying drawings and finally embodied in the appended claim.

In said drawings.

A suitable support is afforded by the loom side $a$ and by the upright $b$ and the pair of stands $c$, said upright and stands being bolted to the floor beside the loom side $a$. $d$ is the main shaft of the loom operatively connected with the lay or batten $e$ and with other parts, not shown, in any well known manner. Shaft $d$ in the present case is the shaft to be driven, and it carries a gear $f$.

The pair of stands $c$, through the medium of vertical adjusting means $g$, support an electric motor $h$ whose shaft $i$ is equipped with a pinion $j$. Any other prime mover may of course be employed.

Secured in the loom side $a$ and the upright $b$ is a shaft $k$ on which are journaled rotary driving and driven members. The driving member consists of a gear $l$ meshing with pinion $i$ and having a peripherally grooved outwardly projecting hub $m$; the driven member consists of a brake-drum $n$ having an inwardly projecting pinion $o$ in mesh with the gear $f$. The two members form a friction clutch, one of them (as $n$) being faced with material $p$ to afford a good friction grip on the other. To establish and disestablish the clutch engagement, one of the members is shiftable against and away from the other; in the present case the driving member $l$ is the shiftable one, and to resist its thrust when the clutch is established a shoulder $q$ on the shaft axially opposes the driven member. The brake-drum $n$ has a smooth fairly broad periphery.

Preferably below the brake-drum is arranged a brake which consists of a lever $r$ movable in a vertical plane and having an inclined slot $s$ in its free end portion and on said free end portion a brake shoe $t$ shaped to fit, and of good material (as wood) to produce good frictional contact with, the smooth metal periphery of the brake-drum $n$. The fulcrum of this lever $r$ is a bolt $u$ adjustable horizontally, and laterally of the loom side $a$, in the slot $v$ in a bracket $w$ attached to said loom side $a$ so as to be vertically adjustable therein.

Figure 4:
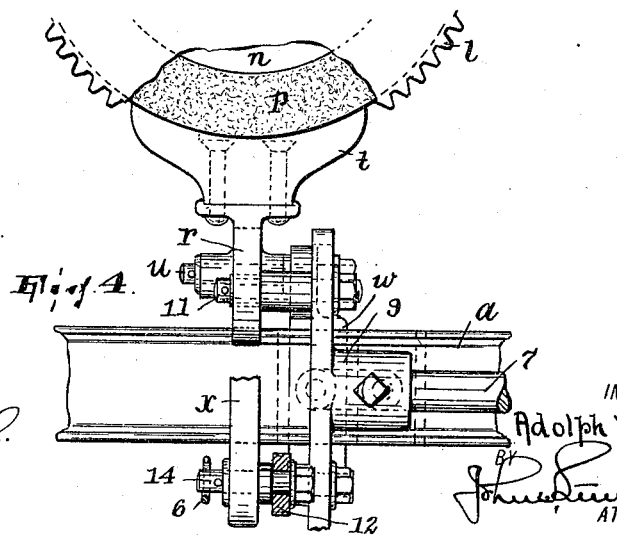
Fig. 4 is a sectional view on the line 4—4 in Fig. 3, certain parts being broken away.

$x$ is an upright lever whose upper end is forked and has the arms of its fork formed as jaws $y$ receiving diametrically opposite studs $z$ on the ring 2 received in the groove of the collar $m$ of gear $l$. The lever $x$ has a lateral extension 3 affording its fulcrum, the same being received and by a pin 4 held in the forked free end of a stud 5 secured in the upright $b$ so as to be adjustable vertically therein. The stud is near the upper end of the lever, so that its lower arm is much the longer one. The lever thus affords powerful leverage for shifting the driving clutch member, such leverage being rather more favorable to the shifting-in than to the shifting-out movement of said clutch member because its fulcrum is relatively outwardly offset with respect to a straight line joining the power and resistance ends of said lever; further, because its fulcrum is thus offset, when the shifting-in movement has been accomplished the weight of the lever is conducive to retaining the parts in the new position. (The tendency of the lever to remain in this position may be assisted, if desired, by a pull spring 6, connecting its lower end with the upright $b$ as shown in Fig. 4.)

For actuating the brake $r$ and lever $x$ I provide a rocker which consists of a horizontal shaft 7 journaled in brackets 8 (projecting from the loom side) below and at right angles to the axis of the driving and driven members $l$ $n$ and a two-armed or T-shaped head 9 secured on said shaft. The arms of said head project one up and the other down, and in longitudinal slots 10 therein are adjustably secured the bolts 11. The upper bolt is engaged in the slot $s$ of brake lever $r$. Pivoted on the lower bolt is a link 12 in a longitudinal slot 13 of which is adjustably secured a bolt 14 to which the lower end of the lever $x$ is pivotally connected. The forward end of shaft 7 has affixed thereto a lever 15 suitably connected with a horizontal shifter rod 16 arranged to slide in guides 17 at the front of the loom.

Figure 1:
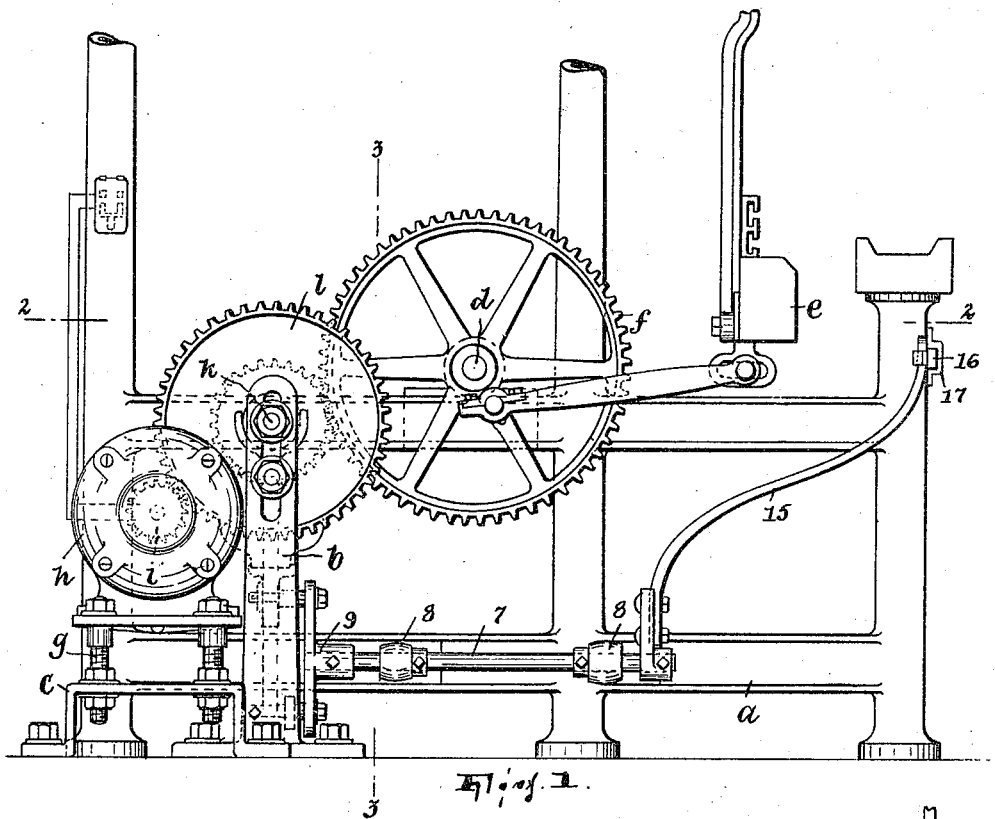
Figure 1 shows in side elevation a narrow-ware loom and driving means therefor containing the present improvement.
Figure 2:
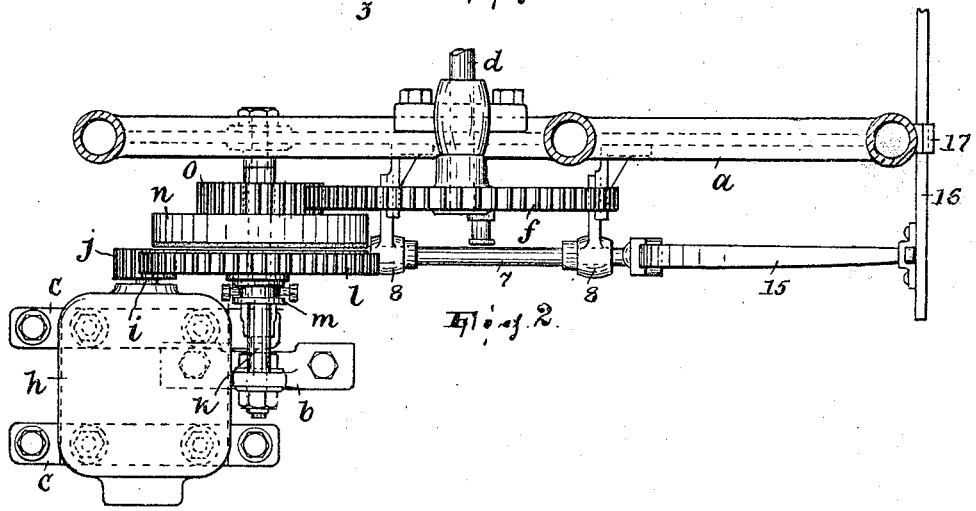
Fig. 2 is a sectional view on the line 2—2 of Fig. 1, showing the driving means in plan.
Figure 3:
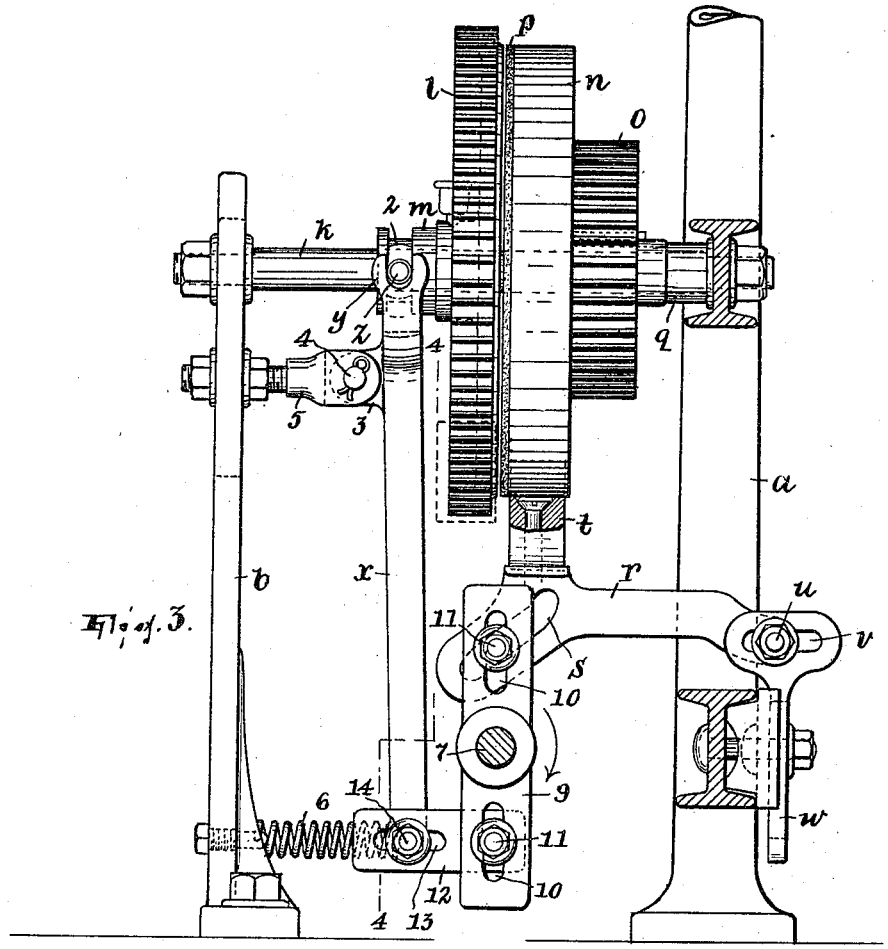
Fig. 3 is a sectional view on the line 3—3 in Fig. 1, as seen from the front.

It will be understood that according as the shifter rod is moved one way or the other so the rocker will be rocked in the direction of or contrary to the direction of the arrow in Fig. 3; further, that the construction and arrangement of the parts are especially designed not only to produce a quick and positive shifting-in or shifting-out movement of the driving member $l$, but to promote simplicity and insure against the moving parts working out of the position to which they have been shifted, as for instance on account of vibration; and in this connection it may be remarked that whereas the weight of the lever $x$ (and spring 6, if present) favors the shifting-in movement, the inertia of and friction existing between the several parts are ample to maintain them in the shifted-out position.

An important element of my invention is the rocker. Being connected with the brake and (through 12×) with the shiftable clutch member at opposite sides of its fulcrum it affords a simple and very effective means to actuate these elements with the development of the power necessary to establish instantaneously a good clutching engagement between the clutch members or a good braking action, according as it is rotated one way or the other; incidentally the braking action is augmented by the brake and rocker being arranged so that the braking thrust developed is toward the periphery of the brake-drum, and the clutching engagement is augmented by interposing between the rocker and the shiftable clutch member a lever whose long arm is connected to the rocker.

Having thus fully described my invention, what I claim as new and desire to secure by Letters Patent is:—

In combination, a support, driving and driven clutch members journaled in said support side by side and one being shiftable toward and from the other into and out of power-transmitting engagement with the latter, and a controlling train of parts for said members including a brake arranged below the driven member and movable up and down into and out of engagement therewith, an upright lever fulcrumed in said support at the side of the shiftable clutch member opposite to the other clutch member, and operatively engaged with said shiftable member and adapted to move the same into and out of engagement with the other member, said lever having the part thereof affording its fulcrum projecting away from the shiftable member, and means, including a rocker, to couple said brake and lever together, whereby the brake and lever are both normally impelled by gravity the former downward out of engagement with the driven member and the latter into position to preserve engagement of the shiftable member with said other member.

In testimony whereof I affix my signature.

ADOLPH WIDMER.

Copies of this patent may be obtained for five cents each, by addressing the "Commissioner of Patents, Washington, D. C."